April 27, 1965    G. T. McCLURE    3,180,695
FLUID PRESSURE BRAKE CONTROL APPARATUS
Filed Oct. 11, 1963
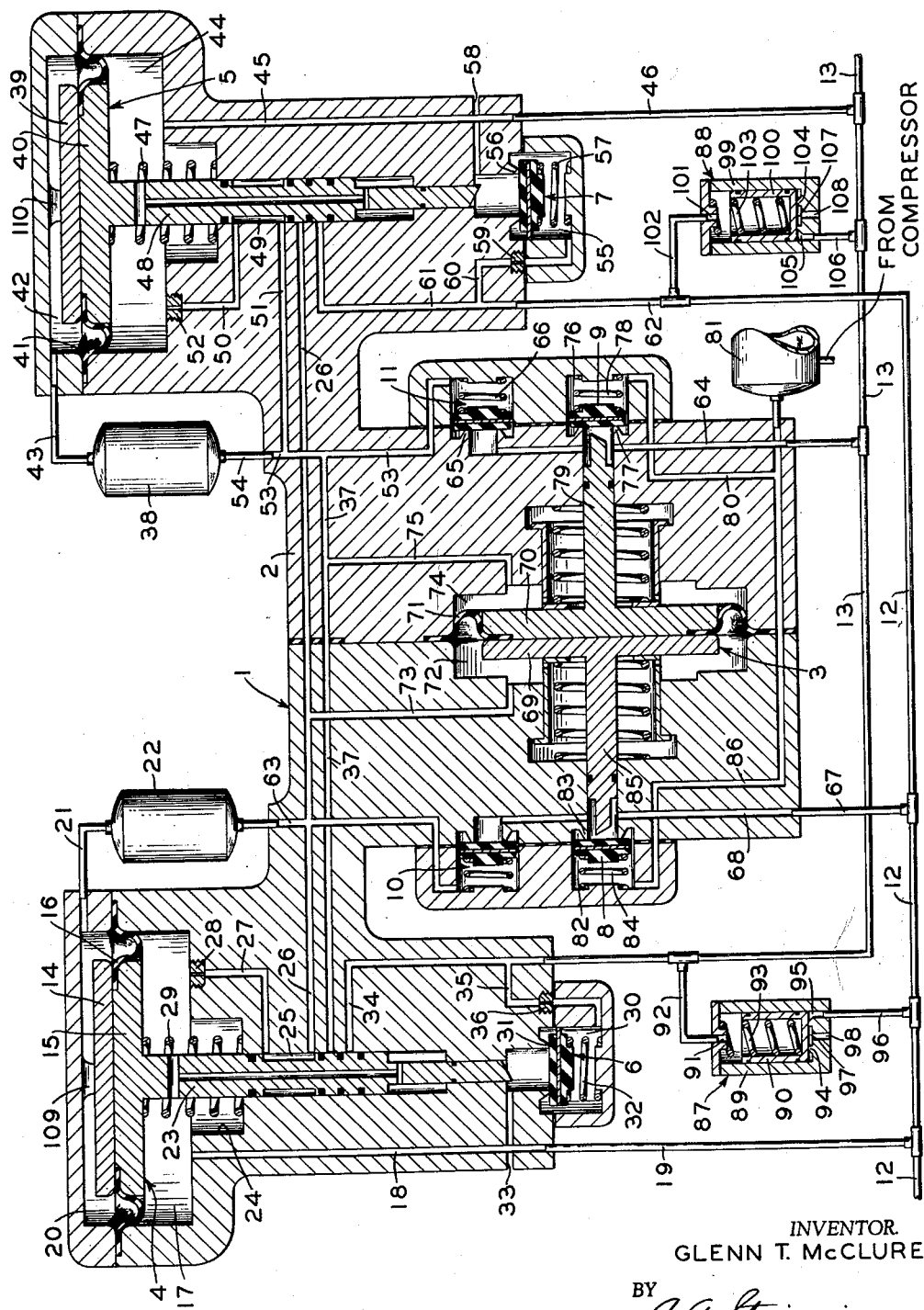
INVENTOR.
GLENN T. McCLURE
BY
*A. A. Steinmiller*
ATTORNEY United States Patent Office 3,180,695
Patented Apr. 27, 1965

3,180,695
FLUID PRESSURE BRAKE CONTROL
APPARATUS
Glenn T. McClure, McKeesport, Pa., assignor to Westinghouse Air Brake Company, Wilmerding, Pa., a corporation of Pennsylvania
Filed Oct. 11, 1963, Ser. No. 315,479
7 Claims. (Cl. 303—86)

This invention relates to a fluid pressure brake control apparatus for railway trains, and, more particularly, to a double-acting relay valve device located on a car at or near the middle of a train for reproducing brake pipe pressure controlled variations from the front to the rear of a long train and vice versa.

The effective movement of goods by railroads, under present day conditions, is dependent on the utilization of longer length cars and longer trains. The over-all length of a train is limited by the brake control equipment which enables the engineer to charge the fluid pressure brake apparatus throughout the train to effect an application of all the brakes in the train and to effect uniform release thereof. Such limitation in length of trains is also due to the pressure gradient in the brake pipe of a train wherein it is necessary at times to shorten the length of a train to be certain that the gradient will not interfere with the normal charging of the brake pipe, the propagation of a brake application, and the recharging of the brake pipe in the train. During exceedingly cold weather, because a greater gradient exists due to the leakage of the various fluid pressure line connections, severe reduction in train length is essential to insure a safe operative braking system.

It is a general purpose of this invention to provide a simplified double-acting relay valve device, located on a special utility car approximately midway of a long freight train, to reduce the over-all pressure gradient and brake pipe friction for the train thereby improving the responses of the fluid pressure brake apparatus of the train. The provision of such a relay valve device permits the lengthening of a train in cold weather. Such relay valve device is simple in operation and facilitates the charging and recharging of the brake pipe from either end of a train, as where a helper locomotive is used on the rear end portion of a train.

In accordance with this invention, the double-acting relay valve device located in a special utility car has one end connected to a brake pipe section connected to the locomotive and the other end connected to another brake pipe section, which section terminates in the caboose. First and second control members are connected, respectively, to the one and the other brake pipe sections and respond to the pressures of their respective brake pipe sections to actuate normally seated check valves upon predetermined rate of pressure reductions in their respective brake pipe sections. The respective check valves are operatively connected to the brake pipe sections such that the first control member is responsive to a predetermined rate of reduction in pressure in the one brake pipe section to actuate one of the check valves to vent the other brake pipe section to the same predetermined pressure as in the one brake pipe section while the second control member is responsive to a predetermined rate of reduction in pressure in the other brake pipe section to actuate the other of the check valves to vent the one brake pipe section to the same predetermined pressure as in the other brake pipe section. Relay valve means having opposed chambers subject to the different brake pipe pressures and operatively connected to such brake pipe sections respond to a brake pipe reduction less than the predetermined rate to operatively connect a pressure source to charge the brake pipe section low in fluid pressure to thereby compensate for leakage of pressure fluid.

Other objects and advantages of the invention will hereinafter more fully appear. In the accompanying drawing there is shown, for purposes of illustration, one form which the invention may assume in practice.

FIG. 1 is a schematic view of a double-acting relay valve constructed in accordance with the principles of this invention.

The double-acting relay valve device 1 is installed on a special utility car to be located approximately in the middle of a long train to assist the engineer in charging the brake pipe as well as producing a brake application on the rear portion of the train, as to be described. Relay valve device 1 comprises a sectionalized casing 2 housing a reservoir release relay valve device 3, a pair of spaced diaphragm piston control valve devices 4 and 5, check valves 6, 7, supply valves 8, 9, and check valves 10, 11 cooperative with brake pipe sections 12 and 13.

The diaphragm piston control valve device 4 comprises a pair of follower discs 14 and 15 which suitably clamp between their outer edges, the inner peripheral edge of an annular diaphragm 16. The outer peripheral edge of annular diaphragm 16 is suitably clamped between portions of the sectionalized casing 2. Diaphragm 16 in piston control valve device 4 is subject on one side to the pressure in a chamber 17, which chamber 17 is connected via a passageway 18 and a conduit 19 to brake pipe section 12 in the forward portion of the train. It is to be understood that brake pipe section 12 can be the rear portion of the train as well, however, such connection is assumed as one example to be discussed. Diaphragm 16 in piston control valve device 4 is subject on the other side to the pressure in a chamber 20, which chamber 20 is connected via a conduit 21 to a reservoir 22. Reservoir 22 is connected via means to be described to the brake pipe section 12. Thus, diaphragm 16 of piston control valve device 4 is subject on opposing sides to the same brake pipe pressure, however, varied in its circuit connection thereto to provide a control means to be described. Follower disc 15 has a downwardly extending valve stem 23 which is slidably received by the rearward portion of a stepped bore 24 communicating with chamber 17. Valve stem 23 has an annular groove 25, which groove 25 in the normal position of piston control valve device 4 interconnects a passageway 26 in sectionalized casing 2 with a passageway 27, which passageway 27 is connected to the pressure chamber 17 via a choke 28. Thus, pressurized fluid is supplied from the brake pipe section 12 to the reservoir 22 via conduit 19, passageway 18, chamber 17, choke 28 and passageways 27 and 26. A spring 29 located in pressure chamber 17 biases piston control valve device 4 upwardly as viewed in FIG. 1 to the normal position.

To provide a follow-up action in the brake pipe section 13 upon a reduction of pressure in the brake pipe section 12, there is provided the check valve 6 in a chamber 30. Check valve 6 is normally biased onto a valve seat 31 by a spring 32 located in chamber 30. Check valve 6 is adapted to be unseated by the lower end portion of valve stem 23, in a manner hereinafter to be explained, to establish communication between chamber 30 and atmosphere via a port 33. Brake pipe section 13 is connected to chamber 30 via a passageway 34, passageway 35, and a choke 36. Thus, upon unseating of check valve 6 by valve stem 23, brake pipe section 13 is vented to atmosphere at a restricted service rate of brake pipe reduction as determined by choke 36.

Assuming a service application of the brakes is effected, the pressure in brake pipe section 12 is reduced as well as in chamber 17, which reduction in pressure causes the downward movement of piston control valve device 4, as viewed in FIG. 1, such that the lower end portion of valve stem 23 unseats check valve 6 to vent the fluid pressure in brake pipe section 13 via passageways 34 and 35, past check valve 6, through chamber 30 and thence through port 33. Such action provides a service brake pipe reduction in the brake pipe section 13 and in the rearward portion of the train assuming brake pipe section 12 is connected to the locomotive. During such service brake pipe reduction, the piston control valve device 4 moves downwardly a sufficient distance to interconnect the passageway 26 with passageway 34 such that the fluid pressure in reservoir 22 will be vented to atmosphere at a restricted rate by its connection to the passageway 26, annular groove 25, passageway 34, passageway 35, past choke 36 and port 33. In addition to such action, passageway 34 will be connected to a passageway 37 and vent at a restricted rate the pressurized fluid from reservoir 38 through annular groove 25 to atmosphere.

Piston control valve device 5 comprises a pair of follower discs 39 and 40 which suitably clamp between their outer peripheral edges the inner peripheral edge of an annular diaphragm 41. Diaphragm 41 has its outer peripheral edge clamped between portions of the sectionalized casing 2. Diaphragm 41 in piston control valve device 5 is subject on one side to the pressure in chamber 42 connected via a passageway 43 to the reservoir 38 for a purpose to be set forth. Diaphragm 41 is subject on the other side to the pressure in a chamber 44, which chamber 44 is connected via passageway 45 and conduit 46 to the brake pipe section 13. Piston control valve device 5 is biased upwardly by a spring 47 located in chamber 44. Lower follower disc 40 has a downwardly extending valve stem 48, which valve stem 48 has an annular groove 49 on its intermediate portion. In the normal charged position of chambers 42 and 44, annular groove 49 on stem 48 interconnects a passageway 50 with a passageway 51. Reservoir 38 is charged with pressurized fluid from brake pipe section 13 and pressure chamber 44 via a choke 52, passageway 50, annular groove 49, passageway 51, a passageway 53 and a conduit 54. To propagate a reduction in brake pipe pressure to the brake pipe section 12 upon a service rate of pressure reduction in brake pipe section 13, there is provided the check valve 7 located in a chamber 55. Check valve 7 is normally biased upwardly into engagement with a valve seat 56 by a spring 57 located in chamber 55. Check valve 7 is adapted to be unseated by the lower end portion of valve stem 48 of piston control valve device 5 to establish communication between the chamber 55 and atmosphere via a port 58. Chamber 55 is connected to the brake pipe section 12 via a choke 59, branch passageway 60, passageway 61 and conduit 62. Upon sufficient reduction of pressure in chamber 44, which chamber 44 is connected directly to brake pipe section 13, piston control valve device 5 and valve stem 49 move downwardly such that the annular groove 49 on the valve stem 48 interconnects passageway 61 with passageway 51 to thereby vent to atmosphere at a restricted rate the pressurized fluid from reservoir 38 via passageway 51, annular groove 49, passageway 61, passageway 60, choke 59, chamber 55 and port 58. In addition, such action also vents at a restricted rate the pressurized fluid in reservoir 22 via passageway 63, passageway 26, annular groove 49, passageway 61, passageway 60, chamber 55 and port 58. Such action allows full equalization of the pressures between the brake pipe sections as well as reservoirs 22 and 38 to thereby stabilize the brake pipe pressure reductions.

Reservoir 38, in addition to being charged from the brake pipe section 13 via chamber 44, choke 52, passageway 50, annular groove 49, passageway 51, is also charged from the brake pipe section 13 via a passageway 64 connected thereto, past check valve 11, passageway 53 and conduit 54. Check valve 11 is normally biased onto a valve seat 65 by a spring 66 subject to being unseated upon sufficient differential in pressure existing in passageway 64 over passageway 53.

Reservoir 22, in addition to being charged from the brake pipe section 12 via chamber 17, choke 28, passageways 27 and 26, in a manner previously explained, is also charged from the brake pipe section 12 via conduit 67, passageway 68, past check valve 10 and passageway 63.

Reservoir release relay valve device 3 comprises a pair of follower discs 69 and 70 which suitably clamp the inner peripheral edge of an annular diaphragm 71. Annular diaphragm 71 has its outer peripheral edge clamped between portions of the sectionalized casing 2. Diaphragm 71 of relay valve device 3 is subject on one side to the pressure in chamber 72, which chamber 72 is connected via passageways 73, 26 and 63 to reservoir 22 and via passageways 73 and 26 to pressure chamber 17 which is subject to the brake pipe pressure from brake pipe section 12. Diaphragm 71 of relay valve device 3 is subject on the other side to the pressure in chamber 74, which chamber 74 is connected via passageway 75, passageway 37, passageway 53, conduit 54 to reservoir 38 as well as to pressure chamber 44 via passageway 50, passageway 51, passageway 37 and passageway 75. Reservoir 38 and pressure chamber 44 are subject to the brake pipe pressure from brake pipe section 13.

To compensate for leakage in the brake pipe section 13 and the various fluid connections thereto, there is provided the normally seated supply valve 9 located in a chamber 76. Supply valve 9 is biased onto a valve seat 77 by a spring 78 located in chamber 76. Supply valve 9 is adapted to be unseated by a stem 79, extending laterally from follower disc 70, to establish communication between chamber 76 and a passageway 80 connected to a pressure source such as reservoir 81. Stem 79 unseats supply valve 9 upon a reduction of pressure in chamber 74 over that in chamber 72. Reservoir 81 is supplied by pressurized air from a compressor (not shown) located on the utility car such that the unseating of supply valve 9 operates to recharge the brake pipe section 13 to its maximum value to compensate for leakage in a manner to be described.

In a similar manner to compensate for leakage in the brake pipe section 12 as well as for leakage in the various connections thereto, there is provided in a chamber 82 the supply valve 8, which supply valve 8 is normally biased onto a seat 83 by a spring 84. Supply valve 8 is adapted to be unseated by a stem 85 operatively connected to follower disc 69 to establish communication between the reservoir 81, chamber 82 and brake pipe section 12. Stem 85 unseats supply valve 8 upon a reduction of pressure in chamber 72 over that in chamber 74.

In order to transmit an emergency brake application from the forward portion of the train to the rearward portion of the train and vice versa, a pair of vent valves 87, 88 are cross-connected between brake pipe sections 12 and 13. Vent valve 87 comprises a cylindrical casing 89 having a piston valve member 90 slidably mounted therein. The one end portion of cylindrical casing 89 has an opening 91 connected to a conduit 92, which conduit 92 is connected to the brake pipe section 13 such that fluid pressure from brake pipe section 13 biases piston valve member 90 toward the other end portion of the casing 89. In addition, a spring 93 located in cylindrical casing 89 has one end portion seated on the one end of casing 89 and the other end engaging piston valve member 90 for biasing piston valve member 90 towards the other end portion of cylindrical casing 89. The lower end portion of piston valve member 90 abuttingly engages an annular valve seat 94. In the normal seated position of piston valve member 90, the outer seated portion thereof cooperates with the casing 89 to define a chamber 95 connected via a conduit 96 to the brake pipe section 12. The inner seated portion of valve member 90 cooperates with casing 89 to define a chamber 97, which chamber 97 is connected to atmosphere via a port 98.

Vent valve 88 comprises a cylindrical casing 99 having a piston valve member 100 slidably mounted therein. The one end portion of cylindrical casing 99 has an opening 101 connected via a conduit 102 to the brake pipe section 12 such that fluid pressure from such brake pipe section 12 biases the valve member 100 towards the other end portion of casing 99. In addition, a spring 103 located within the cylindrical casing 99 biases piston valve member 100 towards the other end portion of the casing 99 into seating engagement with an annular valve seat 104. In the seated position of valve member 100, the outer seated portion thereof cooperates with the casing 99 to define a chamber 105, which chamber 105 is connected via a conduit 106 to the brake pipe section 13. The inner seated portion of the piston valve member 100 cooperates with the cylindrical casing 99 to define a chamber 107 which is vented to atmosphere via a port 108.

In the operation of the double-acting relay valve device 1, assume initially that the reservoir 81 is charged to the maximum brake pipe pressure by a compressor located on the special utility car which is located approximately in the middle of a long train, and that the forward portion of the train is charged initially from the locomotive such that brake pipe fluid flows through and charges the brake pipe section 12 in the forward portion of the train. Pressurized fluid then flows from brake pipe section 12, through conduit 19, passageway 18 to chamber 17 to thereby bias piston control valve device 4 upwardly, as viewed in FIG. 1, such that the follower disc 14 is in engagement with abutment 109 in chamber 20. Pressurized fluid then flows at a restricted rate from pressure chamber 17 via choke 28, passageway 27, annular groove 25 and passageway 26 to pressurize reservoir 22. Pressurized fluid from pressure chamber 17 also flows to chamber 72 of release relay valve device 3 via choke 28, passageways 27, 26 and 73. Reservoir 22 and chamber 72 receive a fast charge from the brake pipe section 12 via conduit 67, passageway 68, past check valve 10 and passageway 63.

Upon sufficient pressurization of chamber 72, relay valve device 3 moves rightward, as viewed in FIG. 1, such that the stem portion 79 unseats supply valve 9 to interconnect the air supply from the reservoir 81 on the utility car to the brake pipe section 13 via passageway 80, chamber 76, past supply valve 9 and the passageway 64. Pressurization of the brake pipe section 13 from reservoir 81 operates to charge the brake pipe section 13 on the rear portion of the train as well as supply pressurized fluid via conduit 46, passageway 45, to chamber 44 to bias the piston control device 5 upwardly such that follower disc 39 abuttingly engages abutment 110 in chamber 42.

Pressurization of pressure chamber 44 operates to supply pressurized fluid at a restricted rate to the reservoir 38 via choke 52, passageway 50, annular groove 49, passageway 51, passageway 53 and conduit 54. Reservoir 38 additionally receives a charge from brake pipe section 13 via passageway 64, past check valve 11, passageway 53 and conduit 54.

Pressurized fluid is additionally supplied from brake pipe section 13 to the pressure chamber 74 to oppose the pressure on diaphragm 71 from chamber 72 of relay valve device 3. Chamber 74 is pressurized from brake pipe section 13 via passageway 64, past check valve 65, passageway 54 and passageway 75 until sufficient pressure is supplied thereto a balance the initial pressure supplied to chamber 72 to thereby move relay valve device 3 to its central neutral position as shown in FIG. 1. Such balanced pressures in chambers 72 and 74 provide a lapped position whereby the respective stem portions 79 and 85 of relay valve device 3 are disengaged from the respective supply valves 8 and 9, and the charging of the rear half of the train is terminated.

Assuming that a helper locomotive were connected to the rear portion of the train such that a charging could be effected initially through the brake pipe section 13, the charging process would be the same as described except that the operation would be from right to left as viewed in FIG. 1. However, the operation of the double-acting relay valve would be arbitrary if charging occurred from both ends since it would assist either half to charge faster depending on precedence of pressures acting on the diaphragm 71 of relay valve device 3.

Any leakage in brake pipe section 13 and the fluid pressure line connections thereto registers as a fluid pressure reduction in chamber 44 while simultaneously reducing the pressure in the reservoir 38 and the pressure chamber 74. Chamber 44 is connected directly to the brake pipe section 13 via passageway 45 and conduit 46 while reservoir 38 and chamber 74 are connected to the brake pipe section 13 via chamber 44, choke 52, passageways 50, 51, 53 and 75. Such reduction in pressure in reservoir 38 operates to reduce the pressure in chamber 42 since conduit 43 connects such reservoir 38 and chamber 42, thereby maintaining a balanced pressure condition between chambers 44 and 42 and maintaining piston valve member 5 in the position as shown in FIG. 1. Chamber 72 connected to brake pipe section 12 does not register any appreciable leakage as compared to chamber 74 which is connected to brake pipe section 13 and the fluid pressure line connections in the rear portion of the train. Since chamber 72 is at a higher pressure than chamber 74, which chamber 74 is slowly reduced in pressure due to the leakage of pressurized fluid in the brake pipe section 13 and the fluid pressure line connections thereto, such differential in pressure operates to move relay valve device 3 rightwardly, as viewed in FIG. 1, to unseat the supply valve 9 and communicates pressurized chamber 76 and reservoir 81 with passageway 64. Such communication operates to charge the brake pipe section 13 and the fluid pressure connections in the rear portion of the train from reservoir 81. In addition to charging of the brake pipe section 13, pressurized fluid from chamber 76 flows past supply valve 9, past check valve 11 to pressurize passageway 53 to charge reservoir 38, chamber 42 (via passageway 43 from reservoir 38) and chamber 44 (via passageway 64, brake pipe section 33 and conduit 46). Thus, the double-acting relay valve device 1 operates to maintain the desired brake pipe pressure in the rear portion of the train thereby compensating for leakage therein.

In order to provide a service brake application, a brake pipe reduction effected in the front end portion of the train operates to reduce the pressure in brake pipe section 12 and in chamber 17, which chamber 17 is immediately below piston control valve device 4. Such action causes control valve device 4 to move downwardly and compress spring 29 such that the lower end portion of valve stem 23 unseats check valve 6 to operatively connect pressure chamber 30 and brake pipe section 13 with atmosphere via port 33. Pressure chamber 30 is connected to the brake pipe section 13 via choke 36, passageways 35 and 34, thereby venting brake pipe section 14 to atmosphere via port 33 to effect a brake pipe reduction in the rearward portion of the train at the same controlled rate as effected in brake pipe section 12 and the forward portion of the train. The pressure in reservoir 22 will be communicated via passageways 63 and 26, annular groove 25, and passageway 37 to the reservoir 38 and to the brake pipe section 13 on the rear portion of the train via annular groove 25 and passageway 34, to thereby equalize the pressures in chambers 72 and 74 to maintain a balanced pressure condition in relay valve device 3 to prevent the supply of pressurized fluid from reservoir 81 to the brake pipe sections. Since chamber 20 (above piston control valve device 4) is connected to reservoir 22 which, in turn, is connected to brake pipe section 13, which brake pipe section 13 is vented to atmosphere, equalization of pressures is established between chamber 20 and chamber 17 such that spring 29 biases piston control valve device 4 into its upper position, as shown in FIG. 1, wherein the stem 23 is disengaged from check valve 6 upon sufficient venting of chamber 30, reservoir 22 and brake pipe section 13.

A brake pipe pressure reduction made in the rear portion of the train, as from the caboose, will be registered through the brake pipe section 13 to chamber 44 of piston control valve device 5, causing piston control valve device 5 to move downwardly and unseat valve 7 to thereby produce a pressure reduction in brake pipe section 12, and on the front end portion of the train, equivalent to the brake pipe pressure reduction being made in the rear portion of the train. Such downward movement of piston control valve device 5 operates to connect reservoir 38 with reservoir 22 via annular groove 49, passageway 51, and passageway 26 such that the chambers 72 and 74 on opposite sides of diaphragm 71 of relay valve device 3 are connected to their respective reservoirs 38 and 22 to maintain relay release valve 3 in a balanced condition to prevent the supply of pressurized fluid from reservoir 81 through the unseating of supply valves 8 or 9. The brake pipe is restored to its full brake pipe pressure in the manner described above.

Assuming that the brake pipe sections 12 and 13 are charged to their maximum pressure, and that an emergency reduction of brake pipe pressure has been effected in the forward portion of the train, such emergency brake pipe pressure reduction operates to register an emergency reduction of pressure in brake pipe section 12. Such pressure reduction in brake pipe section 12 registers a similar reduction in the casing 88 via conduit 102 such that the pressurized fluid in chamber 105 reacts upon the valve member 100 to compress spring 103 and thereby unseat valve member 100 from valve seat 104 to interconnect brake pipe section 13 and passageway 106 with the port 108 to thereby vent brake pipe section 13 to atmosphere at an unrestricted rate to effect an emergency reduction of pressure in brake pipe section 13. In a similar manner, an emergency reduction of pressure in brake pipe section 13 reduces the pressure at a rapid rate in casing 87 via passageway 92 such that the pressurized chamber 95 which is connected to brake pipe section 12 via passageway 96 reacts upon valve member 90 to compress spring 93 and thereby unseats valve member 90 from valve seat 94 to interconnect brake pipe section 12 and passageway 96 to port 98 to thereby vent brake pipe section 12 to atmosphere at an unrestricted rate. Such reduction of pressure operates to effect an emergency brake pipe reduction in the rear portion of the train. The recharging of the brake pipe either after a service or emergency rate of brake pipe reduction is as described above. Obviously, upon such venting of brake pipe sections 12 and 13 to atmospheric pressure, the valves 87 and 88 are restored to their normal closed position by the biasing action of springs 93 and 103 whereby the valve member 90 engages valve seat 94 and valve member 100 engages valve seat 104. With the above-described relay valve device 1, either brake pipe section 12 or 13 may be connected to the caboose or locomotive and the operation is similar to that described above.

Obviously, many modifications and variations of the present invention are possible in the light of the above teachings. It is, therefore, to be understood that within the scope of the appended claims, the invention may be practiced otherwise than as specifically described.

Having now described the invention, what I claim as new and desire to secure by Letters Patent, is:

1. A brake pipe control system comprising:
   (a) a pair of oppositely extending brake pipe sections maintained at a given level of pressure wherein one of said brake pipe sections is operatively connected to the locomotive of the train and the other of said brake pipe sections is operatively connected to the caboose in the rear portion of the train,
   (b) a control device operatively connected to said pair of brake pipe sections,
   (c) a pair of control means in said control device,
   (d) a pressure source,
   (e) one of said control means responsive to a service rate of brake pipe pressure reduction in said one brake pipe section to provide a similar service rate of brake pipe pressure reduction in said other brake pipe section,
   (f) the other of said control means is responsive to a service rate of brake pipe pressure reduction in said other brake pipe section to provide a similar service rate of brake pipe pressure reduction in said one brake pipe section, and
   (g) other means in said control device responsive to a reduction in brake pipe pressures at a rate lower than said predetermined rate in either of said brake pipe sections operative to connect said brake pipe section that is subject to such reduction to said pressure source for supplementing the pressurized fluid therein to said given level of pressure.

2. A brake pipe control system comprising:
   (a) a pair of brake pipe sections adapted to be maintained at a given level of pressure, with one of said brake pipe sections operatively connected to the locomotive in one portion of a train and the other of said brake pipe sections operatively connected to another portion of a train wherein said one portion of a train and said other portion of a train extend in opposite directions from said control device,
   (b) a control device operatively connected to said pair of brake pipe sections,
   (c) said control device having a pair of control valve means,
   (d) one of said control valve means movable from a neutral position to an actuated position in response to a service rate of brake pipe pressure reduction in said one brake pipe section to provide a similar service rate of brake pipe pressure reduction in said other brake pipe section,
   (e) the other of said control valve means movable from a neutral position to an actuated position in response to a service rate of brake pipe reduction in said other brake pipe section to provide a similar service rate of brake pipe reduction in said one brake pipe section,
   (f) relay valve means having opposed control chambers with one of said control chambers operatively connected to said one brake pipe section through said one control valve means in said neutral position and with the other of said control chambers operatively connected to said other brake pipe section with said other control valve means in said neutral position,
   (g) said relay valve means responsive to a reduction in brake pipe pressure at a rate lower than said service rate of reduction in either said one brake pipe section or said other brake pipe section to connect to a pressure source said pressure chamber that is subject to such lower rate of reduction for supplementing the pressurized fluid therein to said given level of pressure, and
   (h) said control device having other valve means interconnecting said opposed control chambers during said service rate of brake pipe reduction to render said relay valve device non-responsive.

3. A brake pipe control valve device for use on a train comprising:
   (a) a casing having a pair of spaced bores,
   (b) each bore housing a movable control member cooperative therewith to define a chamber,
   (c) said pair of chambers maintained at certain maximum pressures wherein one of said chambers is adapted to be connected to the brake pipe section in the forward portion of the train and the other of said chambers is adapted to be connected to the brake pipe section in the rear portion of the train, (d) a pair of normally seated check valves, (e) one of said check valves operative upon actuation to connect said other chamber and associated brake pipe section to atmosphere, (f) the other of said check valves operative upon actuation to connect said one chamber and associated brake pipe section to atmosphere, (g) one of said control members located in said one chamber and being responsive to a predetermined rate of reduction in pressure in said one chamber operative to actuate said one check valve to effect a corresponding predetermined reduction of pressure in said other chamber and associated brake pipe section, (h) the other of said control members located in said other chamber and being responsive to a predetermined reduction in pressure in said other chamber operative to actuate said other check valve to effect a corresponding predetermined reduction of pressure in said one chamber and associated brake pipe section, (i) a pair of reservoir means wherein one of said reservoir means is connected via a throttle valve means to said one chamber for communication therewith, and the other of said reservoir means connected via a throttle valve means to said other chamber for communication therewith, (j) relay valve means having opposed portions wherein one of said opposed portions is operatively connected to said one reservoir means and the other of said opposed portions is operatively connected to said other reservoir means, (k) a source of supply pressure, (l) said relay valve means responsive to a rate of reduction in pressure in either of said chambers and their associated brake pipe sections less than said predetermined rate of reduction for connecting said chamber so reduced to said pressure supply source for charging thereof, and (m) means interconnecting said pair of reservoir means during actuation of said check valves to stabilize said relay valve means.

4. A brake pipe control system comprising:

(a) a pair of brake pipe sections maintained at certain maximum pressures wherein one of said brake pipe sections is located in the forward portion of the train and the other of said brake pipe sections is located in another portion of the train, (b) a first and second control member, (c) each of said control members having a diaphragm responsive to a differential in pressure between opposing chambers, (d) one chamber of said first control member being connected to said one brake pipe section and the other chamber of said first control member being connected to a first reservoir, (e) one chamber of said second control member being connected to said other brake pipe section and the other chamber of said second control member being connected to a second reservoir, (f) each of said control members having valve means movable therewith, (g) said valve means of said first control members operatively connecting via a throttle said one chamber of said first control member with said reservoir of said first control member in the normal charge position of said one brake pipe section, and said valve means of said second control member connecting via a throttle said one chamber of said second control member with said reservoir of said second control member in the normal charged position of said other brake pipe section, (h) a pair of normally seated check valves having one check valve operative upon actuation to connect said other brake pipe section to atmosphere at a controlled service rate, and having another check valve operative upon actuation to connect said one brake pipe section to atmosphere at a controlled service rate, (i) said first control member responsive to a predetermined rate of reduction in pressure in said one brake pipe section to actuate said one check valve and said second control member responsive to a predetermined rate of reduction in pressure in said other brake pipe section to actuate said other check valve, (j) each of said valve means being responsive with their respective control members and movable therewith, and (k) said valve means operatively interconnecting said reservoirs with said brake pipe sections upon said predetermined rate of reduction in pressures in said one or said other brake pipe section to equalize said reservoirs and brake pipe sections.

5. A brake pipe control system as set forth in claim 4 wherein:

(a) said control valve device has a relay valve means which relay valve means has opposing control chambers, (b) one of said control chambers is connected to said first reservoir and the other of said control chambers is connected to said second reservoir, (c) said relay valve means having a pair of oppositely extending stem portions operative to unseat supply valve means upon a differential in pressure between said control chambers, and (d) said supply valve means upon being unseated operative to connect a pressure source to said control chamber lower in pressure and the connections thereto upon unseating of said supply valve means.

6. A brake pipe control system for use on a train comprising:

(a) a casing, (b) a pair of brake pipe sections adapted to be charged to a certain maximum pressure wherein one of said brake pipe sections is adapted to be connected to the locomotive of the train and the other of said brake pipe sections is adapted to be connected to the caboose, (c) a first and second movable abutment means, (d) each of said abutment means being cooperative with said casing to define a pair of oppositely disposed pressure chambers, (e) one chamber of said first movable abutment means being connected to said one brake pipe section and the other chamber of said first movable abutment means being connected to a first reservoir, (f) one chamber of said second movable abutment means being connected to said other brake pipe section, and the other chamber of said second movable abutment means being connected to a second reservoir, (g) each of said movable abutment means having a greater effective area exposed to said other chamber than said one chamber to thereby bias each of said movable abutment means toward said one chamber upon development of balanced pressures in said oppositely disposed pressure chambers, (h) means in each of said one chambers for biasing said movable abutment means towards said other chambers, respectively, (i) each movable abutment means having a valve stem movable therewith, (j) said valve stems operative to actuate normally seated valve member respectively upon greater pressure developed in said other chamber over the associated oppositely disposed pressure chamber, (k) said valve member actuated by said first movable abutment means operative to connect said other brake pipe section to vent at a restricted rate, and said valve member actuated by said second movable abutment means operative to connect said other brake pipe section to a vent at a restricted rate, (l) said valve stem of said first movable abutment means in the normal balanced position operatively connects said one chamber of said first movable abutment means to said first reservoir, and said valve stem of said second movable abutment means in the normal balanced position operatively connects said one chamber of said first movable abutment means to said second reservoir, (m) said one brake pipe section operatively connected to said first reservoir via a first one-way check valve, and said other brake pipe section operatively connected to said second reservoir via a second one-way check valve whereby said first and second reservoirs are subject to receiving a fast charge, and (n) said valve stems operative upon predetermined unbalanced pressure conditions in said oppositely disposed pressure chambers to interconnect said reservoirs and to interconnect said reservoirs with certain of said brake pipes.

7. A brake pipe control system as set forth in claim 6 wherein:

(a) a relay valve device is cooperative with said casing to define a pair of oppositely disposed control chambers wherein unbalanced pressure conditions in said control chambers cause movement of said relay valve device, (b) one of said control chambers being connected to said first reservoir, and the other of said control chambers being connected to said second reservoir, (c) a pair of spaced normally seated supply valves operatively connected to a pressure source, (d) said relay valve device having a pair of projections extending in opposite directions toward said pair of supply valves, respectively, and adapted to actuate said supply valves, and (e) one of said supply valves operative upon actuation by one of said projections to connect said pressure source to said one brake pipe section and to connect said pressure source to said first reservoir via said first one-way check valve, and the other of said supply valves operative upon actuation by the other of said projections to connect said pressure source to said other brake pipe section and to connect said pressure source to said second reservoir via said second one-way check valve.

References Cited by the Examiner

UNITED STATES PATENTS

| | | | |
|---|---|---|---|
| 604,861 | 5/98 | Hogan | 303—82 |
| 1,845,492 | 2/32 | Farmer | 303—10 X |
| 1,969,812 | 8/34 | McCune | 303—82 |

ARTHUR L. LA POINT, *Primary Examiner.*

EUGENE G. BOTZ, *Examiner.*